UNITED STATES PATENT OFFICE.

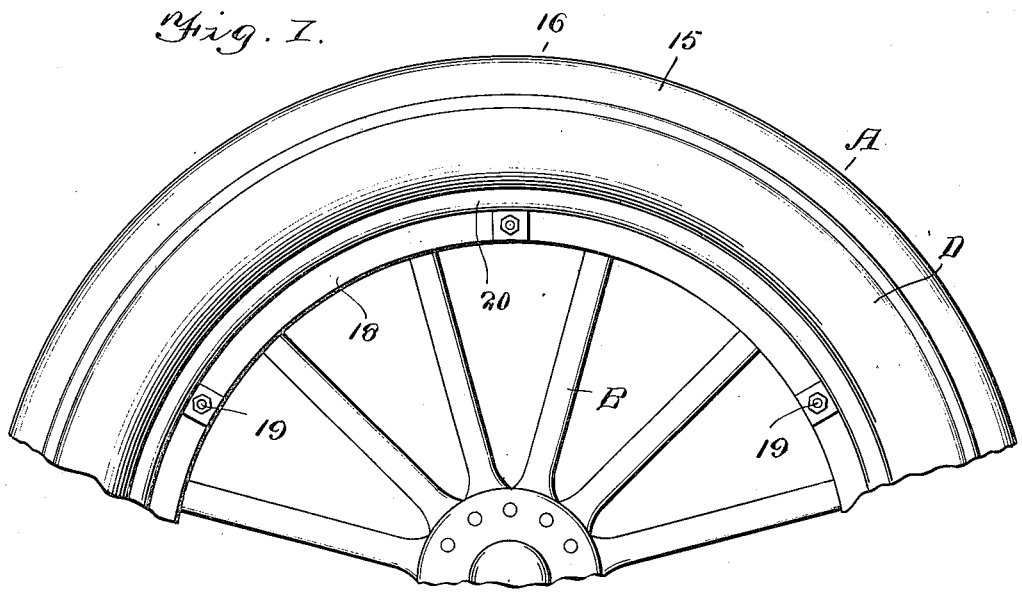
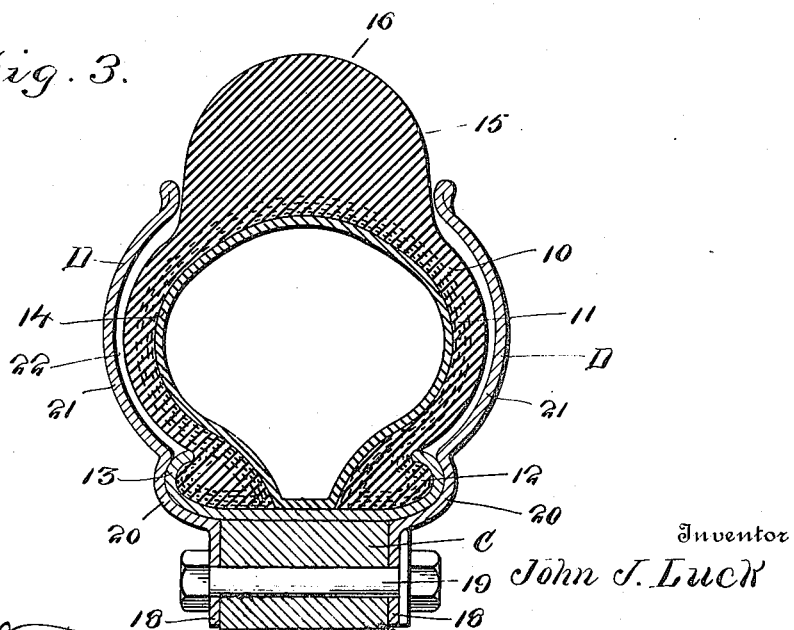

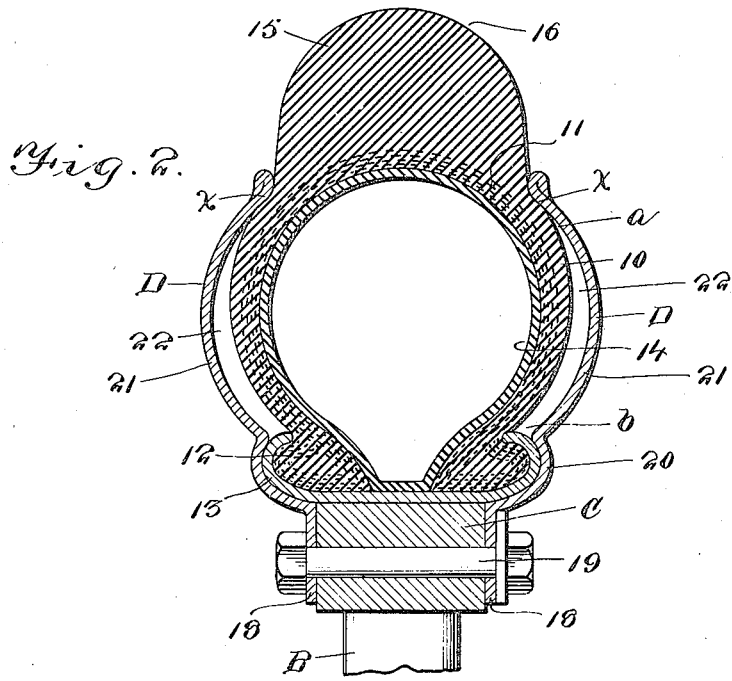
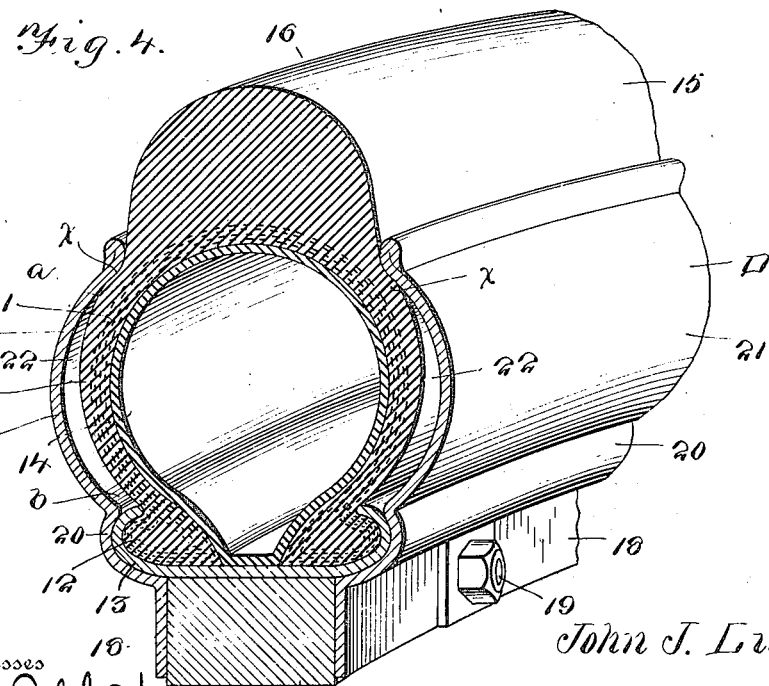

JOHN J. LUCK, OF SAN ANTONIO, TEXAS.

TIRE CONSTRUCTION.

1,323,079.  Specification of Letters Patent.  Patented Nov. 25, 1919.

Application filed November 10, 1914. Serial No. 871,344.

*To all whom it may concern:*

Be it known that I, JOHN JULIUS LUCK, a citizen of the United States, residing at San Antonio, in the county of Bexar and State of Texas, have invented new and useful Improvements in Tire Construction, of which the following is a specification.

The primary object of the invention is the provision of a tire construction wherein the inner pneumatic tube is of the ordinary well-known type and is inclosed within a detachable casing or shoe, the tread of which is materially thickened so that it will withstand excessive shocks and jars incident to the use thereof, yet the tire as a whole will possess maximum resiliency to absorb such shocks and jars, and with its allied tread prevent the puncturing thereof or its susceptibility to rim cuts, blow-outs, stone bruises and sand blisters, thereby assuring longevity to the tire irrespective to the load or use thereof.

Another object of the invention is the provision of a tire wherein the casing or shoe, which is of novel form, is confined for a portion of its cross sectional area, throughout the circumference thereof, between side guards which protect the said casing or shoe from rut chafing and rim cutting, the side guards being of novel form to assure serviceability and safety in the use of the tire.

A still further object of the invention is the provision of a tire construction wherein the association of the casing or shoe and the side guards prevent the accumulation of dirt and sand circumferentially of the wheel on which the same are mounted between the said casing or shoe and the guard, and at the same time affords resistance against any lateral thrust of the tire or frictional wear on the casing or shoe at the sides thereof.

A still further object of the invention is the provision of a tire construction which can be readily and quickly mounted upon the rim of a wheel and detached therefrom, as well as being capable of use both with wood and wire spoked wheels.

A still further object of the invention is the provision of a tire of this character which is simple in construction, thoroughly reliable and efficient in operation, strong, durable, possessing maximum resiliency, and also one which may be manufactured at a minimum expense.

Further objects will be in part obvious and in part hereinafter pointed out.

The invention accordingly consists in the features of construction, combination of elements and arrangement of parts which will be exemplified in the construction hereinafter set forth, and the scope of the application of which will be indicated in the following claims.

In the drawings:—

Figure 1 is a side elevation of an automobile wheel showing the tire construction in accordance with the invention applied thereto.

Fig. 2 is an enlarged fragmentary vertical transverse sectional view therethrough.

Fig. 3 is an enlarged vertical transverse sectional view showing the tire depressed.

Fig. 4 is an enlarged fragmentary perspective view.

Similar reference characters indicate corresponding parts throughout the several views in the drawings.

Referring to the drawings in detail, A designates generally a vehicle wheel of the type employed with automobiles, B the spokes, and C the felly thereof, although it is to be understood that in lieu of this particular type of wheel the wire spoked wheel can be substituted for the use of the tire construction hereinafter fully described.

The tire construction comprises a casing or shoe 10, preferably made from rubber with the canvas or fabric plies 11 embedded therein as usual, and is formed with the ordinary clencher flanges 12 for detachable engagement in the clencher rim 13 of the ordinary well-known construction disposed concentrically about the felly C against the outer periphery thereof. Within this casing or shoe 10 is adapted to be received the inner pneumatic tube 14, which is of the ordinary well-known construction. Integrally formed with the casing or shoe 10 is a materially thickened annular tread 15 preferably made solely from rubber, and is molded or otherwise formed with the casing or shoe 10 when being made, the external wearing surface 16 of said tread being rounded in contradistinction to a straight or flat surface, and this tread is disposed centrally upon the casing or shoe, the width of which is greater than the said tread so that the side walls of the casing or shoe bulge outwardly for a distance beyond the sides of the tread for a purpose presently described.
Arranged on opposite sides of the casing or shoe 10 are side rings or annulus D formed with inner peripheral angle flanges 18 which are disposed against opposite side surfaces of the felly C and are detachably fastened thereto in any suitable manner, preferably through the medium of transverse bolts 19 which are passed at intervals through both the flanges and felly, while adjacent to these flanges 18 are outwardly struck curvilinear bulges 20 forming seats in the said rings or annulus D for the clencher rim 13. The remaining portions of the rings or annulus D are outwardly bowed as at 21 so that the outer peripheral edges thereof will be disposed in juxtaposition to the sides of the tread 15, while the innermost points of these peripheral outer edges will contact with the side walls of the casing or shoe 10. Thus in this manner it will be seen that a normally sealed air space 22 will be located between the external side surfaces of the casing or shoe 10 and the said rings or annulus D, which spaces 22 extend from the points a—b circumferentially of the casing or shoe at opposite sides thereof and externally of the same.

When the inner tube 14 is inflated it increases the cross sectional area of the casing or shoe 10 as usual so that the side walls thereof will contact with the rings or annulus D at the points X for the closing of the air spaces 22 so that they will be normally sealed, yet on the inward displacement of the tread portion of the casing or shoe 10 the air spaces 22 will open to the atmosphere only at the point of the displacement of such tread portion, and during this displacement of the latter by reason of the particular formation of the outer peripheral edges of the rings or annulus D no frictional wear will occur on the sides of the tread portion, the opening of the air spaces 22 being for a purpose hereinafter set forth. By the presence of the air spaces externally of the casing or shoe it keeps the tire cool during the use thereof and multiplies the air resistance to increase the resiliency of the tire, as will be clearly obvious.
The air spaces 22 will pocket atmospheric air, which is expelled therefrom at the point of the contact of the tread 15 with the ground or surface over which the tire travels by reason of the inward thrust of the tire at its tread, which causes the outward lateral movement of the sides of the casing or the shoe 10 so that these sides act as a bellows to drive the air from the spaces 22, thereby dispersing any dust, dirt or other foreign matter or accumulation between the sides of the casing or shoe and the guards.

The guard rings or annulus D protect the opposite sides of the casing or shoe 10 from rim cutting, rut chafing, stone bruises or street curb bruises, while the tread 15 prevents punctures, blowouts and sand blisters, it being understood of course that the guard rings D are preferably made from metal possessing the required rigidity and strength so that the side guard rings D will resist lateral thrusts of the casing or shoe 10, yet the latter will possess maximum resiliency for absorbing shocks and jars incident to the travel of the wheel, and at the same time will minimize the possibility of punctures or blow-outs.

It will be apparent that when the tread responds to any irregular surface during the travel of the wheel, the thrust will be inwardly on a true vertical axis, and such inward displacement is resisted by the pounds pressure of air within the inner tube 14, and additionally by the circumferential and transverse contours of the thickened tread 15 so that the possibility of the breakage of the casing or shoe is reduced to the minimum, yet the tire as a whole possesses maximum acquired resiliency for absorbing all shocks and jars incident to the use thereof.

It will be clearly apparent that by having the casing or shoe 10 supporting the tread 15 containing the tube 12 maximum resiliency is attained, because the thickened tread 15 more readily responds by reason of being supported by the pneumatic tube 14 than in event that it be mounted directly on the felly and additionally the possibility of the cutting of the said tread or any damage thereto when traveling over a surface by contacting with sharp obstacles is reduced to a minimum, and thus the life of the tire is prolonged.

The tire in this instance is shown adaptable for use on wheels of pleasure cars, although it is to be understood that the tire is equally adaptable for use on either light or heavy trucks.

From the foregoing description, taken in connection with the accompanying drawings, the construction of the device will be clearly understood, and therefore a more extended explanation has been omitted.

What is claimed is:—

A vehicle wheel comprising a felly, a rim thereon, a tire carried by said rim and having a thickened tread and its outer curved sides plain, and a guard plate connected with each side of the felly and each plate having a curved part engaging with the curved edge of the rim and a semi-circular portion surrounding the curved sides of the tire and spaced therefrom to form air chambers on each side of the tire and the outer edges of the said plate slidingly engaging with the sides of the thickened tread, each guard plate lying entirely on one side of the wheel.

In testimony whereof I affix my signature in presence of two witnesses.

JOHN J. LUCK.

Witnesses:
F. W. PARKER,
BENNETT S. JONES.